United States Patent [19]

Clark et al.

[11] Patent Number: 5,490,251
[45] Date of Patent: Feb. 6, 1996

[54] METHOD AND APPARATUS FOR TRANSMITTING DATA OVER A SIGNALLING CHANNEL IN A DIGITAL TELECOMMUNICATIONS NETWORK

[75] Inventors: William E. Clark; Lonnie A. Olson, both of Omaha, Nebr.

[73] Assignee: First Data Resources Inc., Omaha, Nebr.

[21] Appl. No.: 742,987

[22] Filed: Aug. 9, 1991

[51] Int. Cl.⁶ .............................. G06F 15/16; H04M 3/22
[52] U.S. Cl. ............... 395/200.2; 395/280; 364/DIG. 1; 364/DIG. 2; 364/401; 379/91; 379/93; 370/110.1; 370/95.1
[58] Field of Search ................. 379/91, 93; 370/110.1, 370/95.1; 364/401; 395/325, 200; 235/380, 381

[56] References Cited

U.S. PATENT DOCUMENTS

| | | | |
|---|---|---|---|
| 4,317,957 | 3/1982 | Sendrow | 380/24 |
| 4,654,482 | 3/1987 | DeAngelis | 379/95 |
| 4,755,992 | 7/1988 | Albal | 370/94 |
| 4,891,503 | 1/1990 | Jewell | 235/380 |
| 4,999,836 | 3/1991 | Fujiwara | 370/110.1 |
| 5,043,983 | 8/1991 | Dorst et al. | 370/110.1 |
| 5,159,594 | 10/1992 | Bales et al. | 370/110.1 |
| 5,184,345 | 2/1993 | Sahni | 370/54 |

*Primary Examiner*—Ken S. Kim
*Attorney, Agent, or Firm*—Pennie & Edmonds

[57] ABSTRACT

A communication system for exchanging information between a remote terminal and a host terminal over a signalling channel of an ISDN network which does not need to establish communication over voice or data channels of the ISDN is disclosed. The communication system transmits credit transactions such as authorization requests from a remote terminal to a host computer, processes such transactions, and transmits a response back to the terminal, in which all such communication is performed over a signalling channel of ISDN. Preferably, the authorization request as well as the response from the host includes a "user-user information element" and are formatted in accordance with the CCITT Q.931 standard.

34 Claims, 5 Drawing Sheets

METHOD AND APPARATUS FOR TRANSMITTING DATA OVER A SIGNALLING CHANNEL IN A DIGITAL TELECOMMUNICATIONS NETWORK

This application is related to application Ser. No. 07/677,717, filed Mar. 29, 1991, entitled "Interactive Sequencing Method for ETC Systems", which is incorporated herein by reference.

FIELD OF THE INVENTION

This invention relates generally to telecommunication systems and, more specifically, to a system for transmitting non-conventional data over a signalling channel such as a D-channel of a Signalling System Number 7 network which is typically part of an Integrated Services Digital Network. A specific and preferred embodiment of this invention relates to a method for transmitting transactions such as authorization requests in an electronic ticket capture (ETC) system having a plurality of remote terminals and at least one host computer, in which the remote terminals communicate with and transmit such transactions to the host computer over the ISDN network and, in particular, over the signalling channel.

BACKGROUND OF THE INVENTION

1. Conventional ETC Systems

A wide variety of payment schemes may be employed by the consumer to purchase goods or services. For example, a consumer may use credit cards, debit cards, personal checks, cash, etc. In accepting any or all of the non-cash forms of payment, it is important that the retail establishment be assured that the credit which it extends to the consumer is within the limits specified by the financing service and that the consumer is current in payments made to the financing service, or that the consumer's checking account and payment history are sufficient to warrant acceptance of a personal check. For these reasons, a variety of services have been established which enable a retailer to perform some type of credit check in a non-cash transaction. Particularly in the case of credit cards, this may include the circulation of pamphlets or other listings indicating the account numbers of credit cards which are not to be honored for various reasons, including poor credit risk and theft. However, such listings are generally cumbersome in use, and exhibit an inherent time lag between distribution of the pamphlets and their actual use which can result in the erroneous acceptance of a charge. Additionally, such pamphlets are not readily applicable to the verification of personal checks.

As a result, a variety of automated systems have been developed which enable a retail merchant to communicate with the company issuing the credit card (or its representative, or a company which will guarantee the personal check or otherwise extend credit, to obtain an immediate indication as to whether or not the credit card or check should be accepted or rejected. Such systems may take the form of a clearing house which, in response to a conventional telephone call, provides verification against listings it maintains at the clearing house. More recently, such systems employing voice communications have been replaced with automated dial-up systems. Such systems automatically read magnetic markings on the credit card or check and transmit data over the conventional voice telephone facilities to interrogate a database as to whether or not the credit card or check may be accepted. These systems are generally known as electronic ticket capture (ETC) systems.

A conventional ETC system employs a plurality of remote terminals which communicate over conventional telephone lines with at least one host computer. Such an ETC system is used to electronically process credit sales and the like. Typically, such remote terminals are located at retail establishments and are referred to as point-of-sale (POS) terminals. These POS terminals provide the host computer with information relating to a variety of transactions such as sales, returns, authorizations, deposit inquiries and voiding of a previously entered transaction.

Of particular interest to the present invention, an authorization transaction typically seeks approval from the host computer for the extension of credit as in credit card sales. An authorization may be performed alone or in conjunction with other transactions such as sales. Transactions which require authorization from the host or which communicate with the host while the transaction is performed, are referred to as on-line transactions. For example, transactions in which a consumer is given credit, e.g., those in which an amount is charged to an account, typically need to be authorized by the host; therefore, such transactions are generally performed on-line. Transactions which may be performed at the remote terminal and which do not require interaction with the host when such transactions are performed, are referred to as off-line transactions.

Each on-line transaction typically involves a conventional telephone call to the host for approval at the time the consumer attempts the transaction. Since off-line transactions do not require communication with the host when the user attempts the transaction, the cost of the telephone call associated with that transaction is saved. However, such off-line transactions eventually need to be communicated to the host. Typically, these off-line transactions are transmitted to the host during end-of-day processing. End-of-day processing is a procedure in which the information related to off-line transactions is transmitted to the host and checked for errors, errors are corrected to the extent possible, and databases are updated, etc. Of course, a telephone call is still required for transmitting off-line data, but the cost of such a call is less than the cost of making a call for each off-line transaction. Such telephone calls are conventional in the sense that a communication link is established between the calling station (i.e., remote terminal) and the called station (i.e., host computer) as in a conventional station-to-station phone call when the called station places its phone or modem in an off-hook state in response to the call from the calling station.

While they reduce the need for human intervention in the verification of credit transactions and decrease delays in compiling and accessing a list of unacceptable account numbers, such automated systems are still subject to a number of drawbacks. Such drawbacks include the high cost of transmission, the need to establish conventional telephone calls, high data transmission errors, lengthy and complex end-of-day processing, inadequate error detection and error recovery schemes, and limited capabilities of the POS terminals.

2. ISDN and SS7 Protocol and Architecture

Integrated Services Digital Network (ISDN) is being promoted by telephone companies in an effort to improve quality and capacity of telecommunications network and provide a variety of services. ISDN specifications have already been introduced by the CCITT, the international communications standards committee. In the U.S. and Canada, subsets and minor variations of these standards are being defined by the major central office equipment vendors. ISDN is generally defined as a network that provides end-to-end digital connectivity to support a wide range of telecommunication services, including voice and non-voice services, to which users have access by a limited set of standard customer interfaces.

The technical concept of ISDN is implemented by using the existing telephone lines to carry a digital signal instead of the conventional analog voice signal. In one embodiment referred to as the basic rate interface (BRI), the digital information is transmitted over three multiplexed channels. In this illustrative embodiment, two 64 kilobits per second (kbps) bearer channels (referred to as "B" channels) are provided for voice or data calls, and one 16 kbps signalling channel (referred to as the "D" channel) is provided for exchanging control information between user and network. Another embodiment, referred to as the primary rate interface (PRI), employs twenty-three B channels and one D channel. Implementation of ISDN requires new central office switching and transmission equipment, and sometimes dramatically different terminal equipment (e.g., telephones, modems, data terminals) at the user or subscriber end of the telephone line. At present, ISDN is available in some cities in the U.S., and is widely implemented in Europe.

As noted above, in basic (BRI) ISDN service, the voice or data information is carried by one of the two B channels of the ISDN. Call set-up transactions necessary to make a connection, or link, are established via the signalling channel. Messages sent to and from the central office on the signalling channel contain the information defining the status of the link and enable the call to be set up on the B channel.

Figure 1:
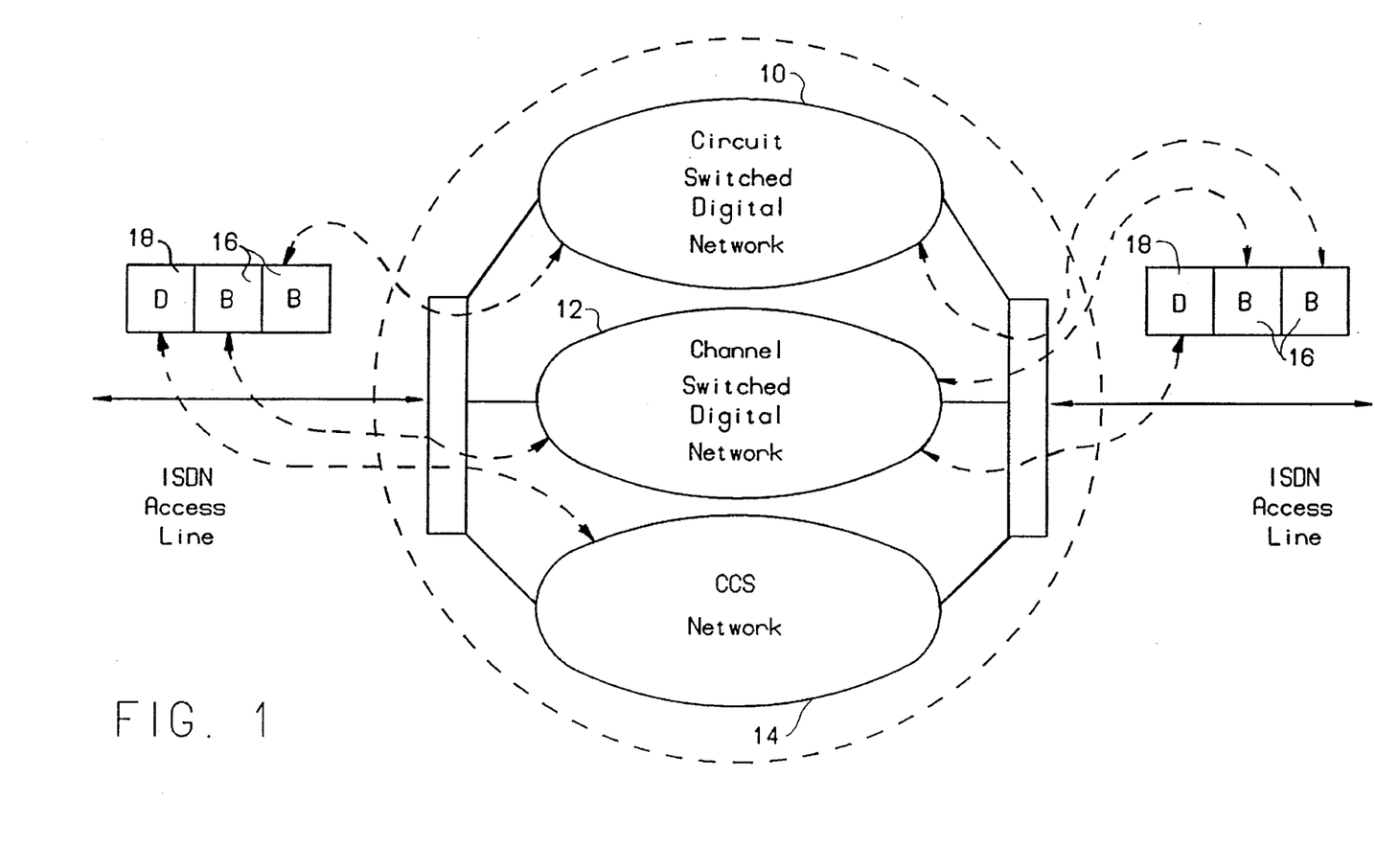
FIG. 1 schematically depicts an integrated services digital network (ISDN) which employs a common channel signalling network.

FIG. 1 schematically depicts an Integrated Services Digital Network (ISDN), which illustratively employs a common channel signalling network (CCS) such as Signalling System 7 (SS7) for network control. Specifically, the ISDN comprises a circuit-switched digital network 10, a channel-switched digital network 12 and a common channel signalling network 14. Illustratively, the common channel signalling network 14 is a Signalling System Number 7 (SS7) network. An ISDN station typically accesses the digital transport facilities via either one of two 64 kbps bearer (B) channels 16. Access to the signalling network occurs on, for example, a 16 kbps signalling (D) channel 18. Alternatively, the D channel may be a 64 kbps channel or any other channel suitable for the transmission of call set-up information.

Each of the two B channels is conventionally used to convey digitized voice samples at the rate of eight thousand, eight-bit samples per second, or data at a rate of 64 kbps. The D channel is used to convey signalling or call set-up information in the form of signalling packets which effect message signalling between ISDN stations. Such message signalling includes signalling among various network nodes which typically control or define path(s) between two ISDN stations.

To establish communication between any two stations in a network it is necessary to organize the information being communicated in a form mutually acceptable to all of the communicating entities. Such an organization of information is referred to as a communications protocol. Typically a communications protocol is designed as a structured set of protocols which form a hierarchy. Each protocol of the hierarchy is referred to as a "layer" or "level", and each layer is dedicated to a specific function or a set of functions. SS7 uses a hierarchical protocol which comprises the following protocols (or layers): message transfer part (MTP), signalling connection control part (SCCP), transaction capabilities applications part (TCAP) and ISDN user part (ISDN UP).

The overall function of the MTP is to transfer signalling messages between signalling points (SPs) of the network in correct sequence and without message loss or duplication. The MTP is subdivided into three layers: a physical layer, a link layer, and a network layer. These layers correspond to layers of the well-known open system interconnection (OSI) standard and provide standardized connectivity, signalling and message-routing functions.

The physical layer, also referred to as OSI layer 1, consists of requirements on physical connection, power transfer, line transmission receive and send signals, timing, framing, multiplexing, maintenance and performance. In other words, this layer provides for transmission of unstructured bit streams over physical medium. Each signalling data link illustratively consists of two data channels providing opposite directions of transmission.

The link or data link layer, also referred to as OSI layer 2, provides the functions of message sequencing and message delineation into frames, error detection and correction through retransmission of error frames, subdivision of the signalling channel into a multiplicity of logical channels, and data layer link recovery.

The MTP signalling network layer, also referred to as OSI layer 3, or more generally as a signalling layer, provides the means to establish, maintain, and terminate network connections at the ISDN user-network interface. Such information is illustratively defined in terms of messages exchanged over a signalling channel such as, illustratively, the D channel of basic and primary rate interfaces. Layer 3 provides reconfiguration of the signalling network during failures and controls traffic during congestion periods. Layer 3 provides functions such as traffic management, link management and route management. This layer makes the utilization of underlying resources such as data link connections transparent to the higher layers of the protocol.

The messages associated with layer 3 protocol control circuit-switched and/or packet-switched connections. Layer 3 utilizes functions and services provided by the data link layer (layer 2), including establishment of data link connections, error-protected transmission of data, notification of unrecoverable data link errors, release of data link connections, notification of data link layer failures, recovery from certain error conditions, and indication of data link layer status. These functions and services provided by layer 2 are further defined in CCITT Recommendations Q.920 and Q.921.

Specific functions performed by layer 3 include the following: processing of primitives for communicating with the data link layer (a primitive specifies the function to be performed and is used to pass data and control information), administration of timers and logical entities (e.g., call-references which are used to identify the call or request at the local user-network interface) used in call control procedures, administration of access resources including B channels and packet-layer logical channels, and checking to ensure that services provided are consistent with user requirements (e.g., compatibility, addresses, service indicators). The following general functions may also be performed by layer 3: routing and relaying, network connections, network connection multiplexing, segmenting (i.e., dividing a long message into smaller messages) and blocking, error detection, error recovery, sequencing, and flow control.

The Signalling Connection Control Part (SCCP) protocol exists at a higher level or layer of the hierarchy than MTP and enhances the functionality provided by MTP. More specifically, the SCCP layer of the protocol is responsible for logical signalling connections, routing and management. The ISDN UP provides call-related services which include interexchange (IXC) signalling to support ISDN access signalling, circuit control and specialized subscriber facilities such as calling party identification, call status checking and trunk management. TCAP supports non-circuit control applications such as service control point (SCP) access for number translation and dial 800 services.

Two separate series of CCITT Recommendations (the I series and the Q series) define the D channel protocol. In particular, the network layer (layer 3) of the D channel protocol is defined in CCITT Recommendation 1.451 or Q.931, each of which is incorporated herein by reference. As stated, this network layer provides call or connection set-up, alerting, routing, and release of ISDN calls. The data link layer (layer 2) is defined in CCITT Recommendation 1.441 or Q.921.

In general, the Q.931 protocol is responsible for call routing and control. The protocol defines various messages that are transmitted between stations such as POS terminals and the host computer by way of various elements or nodes of the network. Further information regarding Q.931 and 1.451 may be found in "Data Communications Standards" Edition III, McGraw-Hill, 1986, which is incorporated herein by reference.

Figure 2:
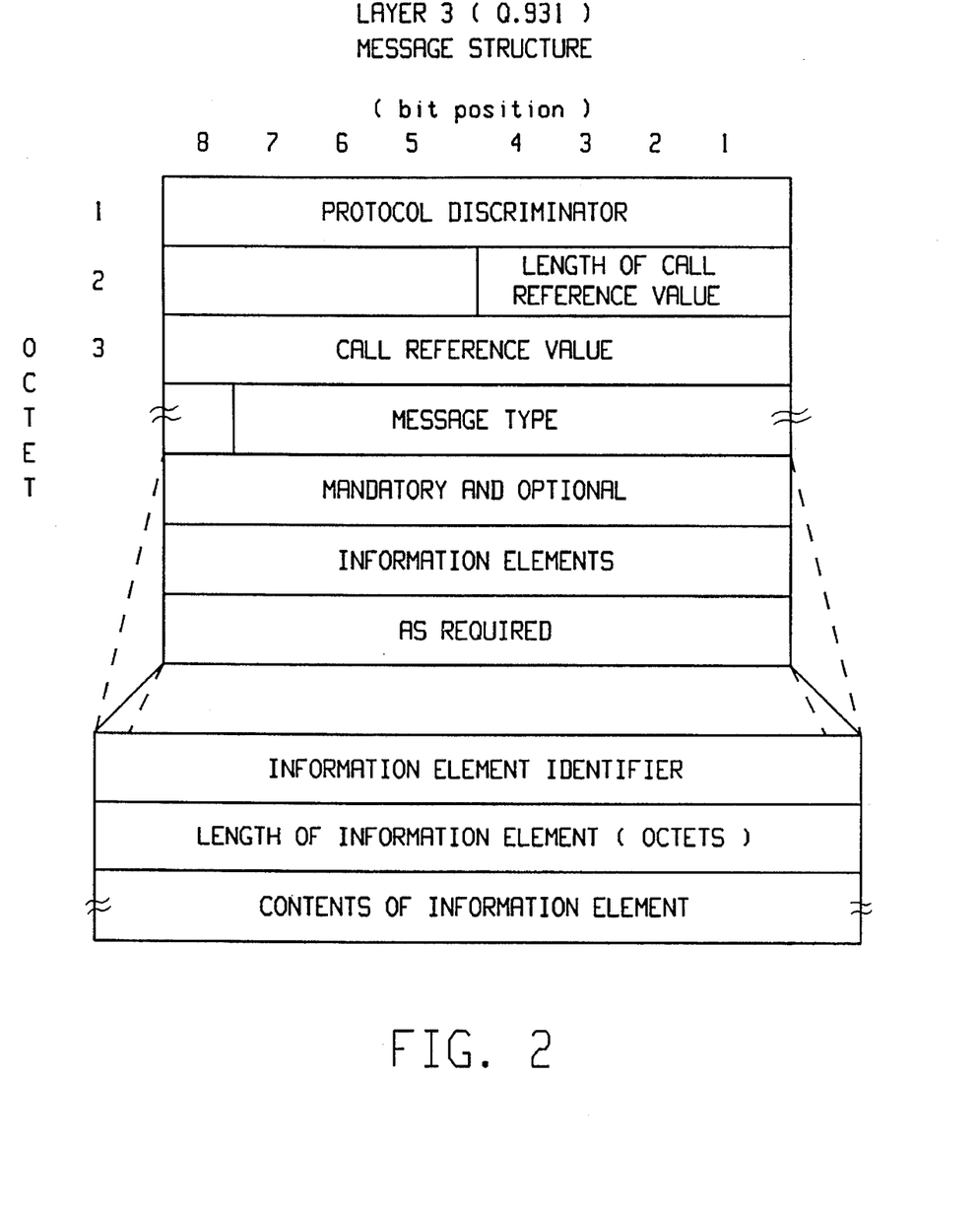
FIG. 2 depicts the message structure of data in accordance with the Q.931 standard layer 3 of an ISDN's D channel.

Referring now to FIG. 2, there is depicted a generic Q.931 message structure. As seen from FIG. 2, the data is organized as a plurality of eight-bit bytes, referred to as octets.

More specifically, octet 1 comprises a "protocol discriminator" which indicates that the message which follows is in accordance with the Q.931 standard. A portion of octet 2 comprises a "length of call reference value" which indicates the length of the message which follows. Octet 3 is a "call reference value" which identifies the call or facility at the user-network interface to which a particular message applies. After the "call reference value" a "message type" field is provided to identify the type of message being sent.

The above elements are common to all Q.931 messages and must always be present, while the content of the following octets are specific to each message type and may include other mandatory and optional elements. These other elements may be single octet information elements or variable length information elements. The variable length elements typically comprise an "information element identifier" to indicate the information elements which follow, as well as a "length of information element" which indicates the number of octets in the following information elements, and the contents of the information element.

Figure 3:
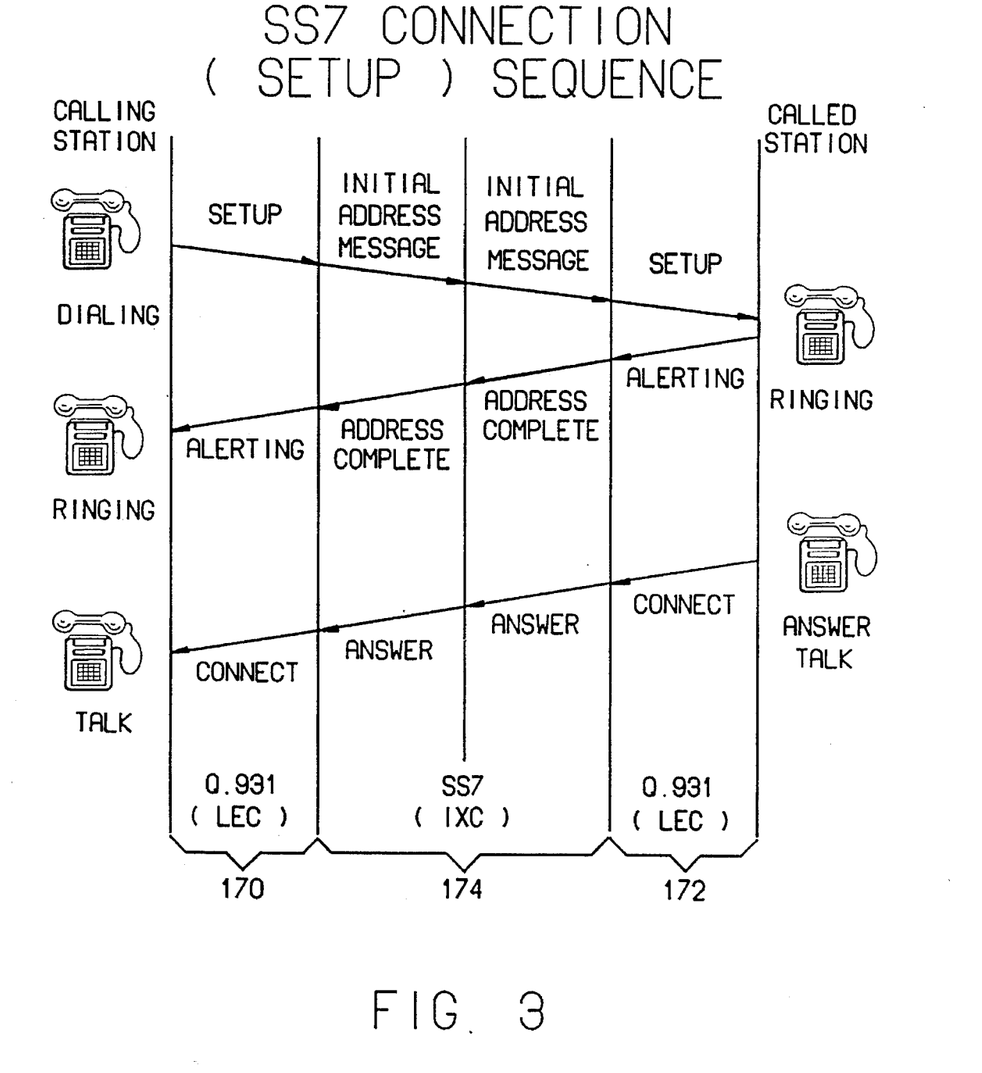
FIG. 3 schematically depicts an illustrative exchange of Q.931 messages for traditional call set-up between calling and called equipment.

FIG. 3 symbolically illustrates an SS7 connection, or call set-up, sequence. As is well known, the telephone network is organized hierarchically. The lowest level of the network beyond a calling or called station is typically referred to as an end office (EO), and the next level of the network hierarchy is typically referred to as an access tandem (AT or AT office). The basic function of the AT office is to provide interconnection for a group of EOs and to provide access to the other levels of network hierarchy such as interexchange carriers (IXCs) and/or local exchange carriers (LECs).

More specifically, FIG. 3 illustrates a typical sequence of messages which may be transmitted over the D channel in accordance with the Q.931 standard. This sequence illustrates the steps necessary for setting up a telephone connection between a calling and a called station. The messages issued and received by the calling station are depicted on the left-hand side of FIG. 3 as 170; the messages issued and received by the called station are depicted on the right-hand side of FIG. 3 as 172. The messages generated by the SS7 network are depicted in the center of FIG. 3 as 174.

Traditionally, when a user places a telephone or modem associated with the calling station off-hook, the calling station sends a "set-up" message to indicate call establishment. The specific fields required for this message and the messages mentioned hereafter are defined in the Q.931 protocol specifications. In response to the "set-up" message the system sends an acknowledgment (not shown) to the calling station and starts the information exchange sequence. When all of the information, such as dialed digits, is collected at the calling station, the set-up message is sent to the called station directly if the stations are directly connected by a local exchange carrier.

Alternatively, and as depicted in FIG. 3, the set-up message is sent to the called station through the SS7 network if the stations are connected by an interexchange carrier. In this case an initial address message (IAM) is sent by the calling station to the called station after the caller completes dialing the number of the called station. The IAM includes an originating point code (OPC) identifying the calling station, a destination point code (DPC) identifying the called station, and a signalling link selection and circuit identification code (CIC) which uniquely identifies the SS7-supported circuit employed, as well as other information such as information encoded as part of the set-up message. The IAM progresses from switch to switch until it is routed to the called station at which time the called station rings.

In response, the called station then sends an "alerting" message to, for example, the SS7 network. The "alerting" message indicates that the called station received the set-up message. This alerting message is forwarded by the SS7 network as part of an "address complete" message to the calling station to indicate the reception of the appropriately addressed "set-up" message by the called station. At this point a ring back signal associated with the alerting message is returned to the calling station to indicate that the called station is ringing. When the called station answers, a "connect" message is sent by the called station to the SS7 network which forwards the connect message as part of an "answer" message to the calling station to indicate call acceptance by the called station. At this point, the B channel voice circuit is established.

When one of the connected parties hangs up, a "disconnect" message (not shown in FIG. 3) is issued. This message is an invitation to release the connection and to free the network resources. The network resources, previously used for the call which just ended, are then available for the next call.

ISDN and SS7 have enabled the development of useful features such as incoming calling line identification, often referred to as "caller ID". Incoming calling line identification displays the caller's number for incoming calls to a called customer station. The feature is implemented by transmitting the calling line identification to the called customer station in a data message. Such data message may be transmitted to an analog station, for example, during a silent interval between ringing periods.

Thus, it is known to display a calling party's number at a called party's station prior to placing the called party's phone off-hook. However, such communication is severely limited in the nature of the information which may be transmitted to the called party. Moreover, the called party must still place his/her phone off-hook to enable any meaningful communication. Additionally, known systems are limited to one-way signalling communication of information useful to a user such as a calling party's number. That is, the called station is incapable of sending equivalent information back to the calling station.

SUMMARY OF THE INVENTION

This invention relates to a communication system for exchanging information between a remote terminal and a host terminal over a signalling channel of an ISDN network without the need to establish communication over voice or data channels of the ISDN. More specifically, this invention relates to a communication system which transmits credit transactions such as authorization requests from a remote terminal to a host computer, processes such transactions, and transmits a response back to the terminal, in which all such communication is performed over a signalling channel of ISDN.

One particular embodiment relates to a method of exchanging information between a host computer and at least one remote terminal comprising the steps of sending a first message from the remote terminal to the host computer over a signalling channel of an ISDN network, sending a second message from the host computer to the terminal over the signalling channel, and sending a third message from the host computer to the terminal over the signalling channel. In this embodiment, the first message contains data representing an information element which contains encoded information to be communicated to an application running on the host computer, the second message is sent in response to the first message, and the third message is sent in response to the first message and typically includes a disconnect message. Advantageously, the exchange of messages between the host computer and the terminal is accomplished without establishing communication over any non-signalling channel provided by the ISDN network.

Preferably, such an embodiment includes the steps of processing the information element communicated to the host, and interacting with at least one database accessible by the host to determine whether a transaction is to be authorized. In this embodiment, the first and second messages correspond respectively to "set-up" and "alerting" messages in accordance with the Q.931 standard.

In one specific implementation, an authorization request is encoded as the contents of an information element of the first message and authorization information such as an approval or denial or an authorization code is encoded as the information element of the second or third messages.

Another embodiment relates to a transaction processing system comprising a host computer system, a plurality of remote terminals, and a network for enabling communication between the host computer and the terminals, the network providing each of the terminals with a plurality of multiplexed communication channels, at least one of which channels is a signalling channel. The host computer includes means for retrieving transaction data from information transmitted to said host, and each of the terminals includes means for generating a message to be communicated to the host computer and means for interpreting a message received from the host computer, the message communicated to the host including the transaction data.

Each of the terminals includes means to exchange information with the computer by sending and receiving messages over the signalling channel of the network without utilizing other channels of the network. Each of the messages includes a first portion for data required for network communication by an appropriate protocol and a second portion for data representing the information that is exchanged between the host computer and the terminal.

Advantageously, the messages to be communicated to the host computer and the messages received from the host computer are transmitted over the ISDN network as part of a user-user information element formatted according to the Q.931 standard, and the exchange of information between the host computer and each of the terminals is typically accomplished solely over a signalling channel such as in the D channel of the ISDN network.

Another embodiment relates to a method for transmitting a request related to a consumer transaction from a merchant to a host computer and for processing the request. This method comprises providing a terminal connected to the host via an ISDN network, inputting consumer data including account information identifying a consumer's account into a memory of the terminal, and encoding an application message string, which includes the consumer data, in accordance with an application-oriented protocol, such that the message string can be interpreted by software running on the host. The communication message is formatted according to a communications protocol, which communication message includes the application message string and data for controlling message transmission across the ISDN network from the terminal to the host. The communication message is then transmitted over a signalling channel of the ISDN network to the host.

Once the host receives the communication, i.e., request message, it is parsed so as to separate the application message string from the other data in the request message. The message string is then interpreted in accordance with the application-oriented protocol so as to identify and process consumer data including consumer account information. Information related to the consumer is then retrieved from the database, a response message is generated on the basis of the retrieved information, and a response communication message is sent over the signalling channel of the ISDN network.

The present invention also relates to an apparatus for performing any of the above methods.

Accordingly, a primary object of the present invention is to provide a new and improved telecommunication system.

Another object of the invention is to provide a system for transmitting non-conventional data over a signalling channel so as to reduce or eliminate the need to establish communication over conventional voice or data channels.

A further object of the invention is to provide an interactive method for two-way communication between two stations without requiring that a conventional telephone call be established.

A still further object of the invention is to provide a telecommunication system having enhanced features.

Another object of the invention is to provide a system for transmitting non-conventional data over a signalling channel such as in a D-channel or a Signalling system Number 7 network within the context of ISDN.

A further object of the invention is to provide a system capable of two-way digital communication between first and second ISDN stations, in which such communication exists via D-channel(s) of a Signalling System Number 7 network.

BRIEF DESCRIPTION OF THE DRAWINGS

These and other objects, features and advantages of the present invention will become more readily apparent from the following detailed description of the invention in which.

DETAILED DESCRIPTION OF THE DRAWINGS

The descriptions of ISDN, layer 3, Q.931, and SS7 presented in conjunction with FIGS. 1–3 have been provided as background information so as to enable one to gain an understanding of and appreciate the context within which the present invention preferably operates.

Further information concerning ISDN, Q.931, SS7 and suitable communications protocol may be found in, for example, "Digital Telephony", by John Bellamy, published by John Wiley & Sons, Inc., 1991, and Proceedings of the IEEE, Feb. 1991, each of which is hereby incorporated by reference.

The presently preferred embodiment of the invention comprises a method and apparatus for exchanging information between a host computer and at least one remote terminal over a signalling channel of an ISDN network in which messages are transmitted back and forth between the host and a terminal without establishing communication over any non-signalling channel provided by the ISDN. In one implementation, a remote terminal transmits a credit authorization request to a host which then transmits to the terminal an approval or denial as part of a disconnect message.

The presently preferred embodiment of the invention will now be described in the context of an electronic ticket capture (ETC) system in which an authorization request is transmitted from a remote terminal to a host computer. In particular, the authorization request is transmitted as part of the information element of Q.931 standard messages transmitted via the network's D channel.

More specifically, what will be referred to as a "user-user information element" contains the "information element identifier" the "length of information element" and the contents of the information element. Advantageously, in the presently preferred embodiment, such a "user-user information element" contains non-conventional data to be utilized by the calling and/or called stations. Such stations employ application programs which utilize the data within the "user-user information element". Such data is transmitted over the D channel of the ISDN. Accordingly, there is no need to establish communication over the B channel since the non-conventional data which would have conventionally been transmitted over the B channel may be transmitted over the D channel as part of the information element of the "user-user information element".

An illustrative ETC system is disclosed in the above-identified application Ser. No. 07/677,717. However, the invention described in that application can be practiced without practicing the present invention.

Figure 4:
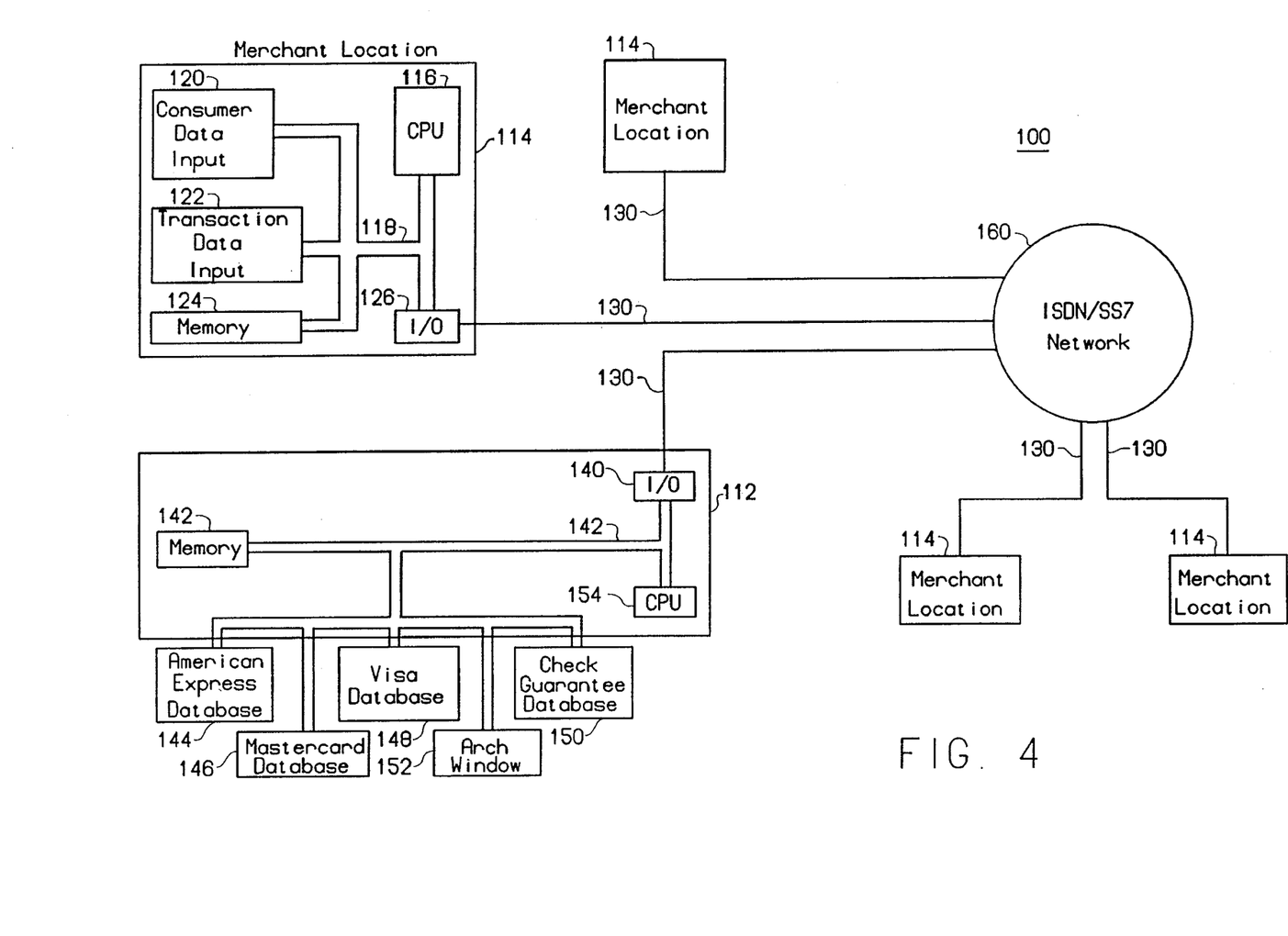
FIG. 4 is a block diagram of an electronic ticket capture (ETC) system implemented as a point-of-sale (POS) system.

Referring now to FIG. 4, there is depicted a block diagram of an illustrative electronic ticket capture (ETC) system 100 implemented as a point-of-sale (POS) system. ETC system 100 comprises a central system or host computer 112 and a plurality of merchant locations or ISDN terminals 114, in this case four although there could be more or fewer than four. Each merchant location 114 includes at least one computer unit 116, such as a microprocessor, and associated peripherals which communicate over a bus 118 with, for example, a consumer data input device 120, a transaction data input device 122, a memory 124 and an input/output (I/O) device 126.

Consumer data input device 120 is located at the point-of-sale to a consumer of merchandise or services from a selected merchant. Device 120 may be a keyboard into which a consumer manually enters identification data and the like. Illustratively, such data may include the consumer's account number, date of birth, and form of payment, i.e., credit card type. Device 120 preferably includes a magnetic card reader adapted to read the magnetic stripe on a conventional plastic card as a consumer swipes the card through the card reader. In the latter event, the magnetic stripe could be encoded with the consumer's account number, date of birth, and type of card. Where a plastic card is used, device 120 may also include a keyboard for entry of a personal identification number (PIN) for verifying that the card is being used by the appropriate individual at the point-of-sale by comparing the PIN to a code stored in the magnetic stripe. The plastic card may be a credit card such as an American Express (TM) card, or a debit card, etc. Device 120 also preferably includes a display which may be used to provide feedback, instructions, or the like to the consumer. While the nature and capacity of the display depends on the specific implementation, a five line liquid crystal display (LCD) capable of displaying thirty characters per line has been found acceptable.

Transaction data input device 122 is also located at the point-of-sale and typically comprises a keyboard or the like by which the sales clerk, for example, would enter the type of transaction and data relating thereto, such as the dollar amount of the merchandise purchased by the consumer. Device 122 may comprise a cash register. Device 120 and device 122 may share components and may be integrated as a single unit.

Consumer data input device 120 and/or transaction data input device 122 preferably includes programmable function keys as well as ISDN function keys. The programmable function keys enable a consumer and/or a sales clerk to customize the terminal for his/her own particular purposes. The ISDN function keys enable a consumer and/or a sales clerk to quickly access and implement various ISDN functions.

Such programmable function keys and ISDN function keys also enable one to perform local and remote diagnostics. Additionally, host 112 may perform diagnostics of terminal 114 without any required intervention by a user or clerk at the terminal. Also, host 112 is capable of remotely downloading programming information and the like to terminal 114 so as to essentially reprogram the terminal to perform new functions and provide a user with enhanced features and capabilities.

The data entered through devices 120, 122 may be stored in memory 124. Memory 124 stores all data relating to on-line as well as off-line transactions at least until such data is transmitted to host 112, reconciled, and correctable errors corrected. Such reconciliation or balancing of data is typically performed at the end of each day during a procedure referred to as end-of-day processing. However, as disclosed in the above-referenced application, Ser. No. 07/677,717, such reconciliation and balancing may be performed throughout the day whenever information is transmitted to the host, thus effectively eliminating the requirement of conventional end-of-day processing. Advantageously, the merchant may edit the transaction data in memory 124 to include, for example, a gratuity or tip, or to void certain transactions. If data sent to host 112 appears to contain errors, the host will request the corresponding data from memory 124, and, in the event of a discrepancy, the data from memory will generally be regarded as correct. Memory 124 may also include merchant data along with software suitable to direct operation of computer 116.

Terminal 114 preferably includes an ISDN telephone which may be part of device 120 and/or device 122. Such a telephone is associated with a codec, modem or similar device operable under control of CPU 116 and is capable of voice as well as data transmission.

As is well understood, computer 116 will function in accordance with the operating program stored in memory 124. To this end, computer 116 may verify that the PIN number matches a code on the card and that the user is authorized to use that card. Alternatively, host 112 may perform such PIN verification. Computer 116 may also determine the charges associated with the transaction. Computer 116 transfers data to the host 112 through I/O device 126, ISDN access line(s) 130, and ISDN/SS7 network 160. Such data may include the consumer's account number and birth date, the merchant data, and data relating to the transaction performed or requested. The information may be transferred either by means of a multiplexing system, a packet switching system, etc.

As will be appreciated, computer 116 may take on a variety of forms and provide a variety of functions, including simply controlling the passage of data entered at devices 120, 122 to host 112. However, computer 116 is preferably programmable and downloadable from the host.

Central system 112 communicates with ISDN/SS7 network 160 by way of ISDN access line(s) 130 through its own I/O device 140. I/O devices 126 and 140 may include, for example, codecs. Data received by central system 112 through its I/O device 140 is provided to bus 142 which permits communication between I/O device 140, memory 142, various databases 144, 146, 148, 150, an automated clearing house (ACH) window 152 and host computer 154 which may include a microprocessor and associated peripherals.

Each of databases 144, 146, 148, 150 as well as ACH window 152 includes a plurality of consumer and merchant accounts. Each consumer account generally includes a unique account number, a balance, and a PIN or the birth date of the consumer. In one embodiment, one or more databases may include a list of account numbers which are not to be honored. Similarly, each of the merchant accounts generally includes at least a unique account number, and a balance. As will be appreciated, databases 144, 146, 148, 150 as well as ACH window 152 are illustrative; any number of a wide variety of databases and services may be accessed. Illustratively, such databases and ACH window 152 are accessed by the ISDN terminals over the D channel of ISDN/SS7 network 160 and the interfaces are compatible with the Q.931 standard.

The data received at I/O device 140 is sorted by computer 154 under control of an operation program stored in memory 142. Specifically, such data includes transaction data and data which identifies the database to be accessed, as well as customer-specific data, such as account number. For example, during nightly or end-of-day processing, once the proper account is found, the balance is credited or debited and the account updated as appropriate. The received merchant data is similarly employed to locate the appropriate merchant account. The merchant's balance is then credited or debited and the account updated appropriately.

Illustrative transactions which may be communicated between the host and the remote terminal include the following: close batch, authorization and ticket, return/credit, ticket only, authorization only, void sale, void return, void ticket only, and previous processing day deposit inquiry. Of these, the close batch and the deposit inquiry are typically requested only by the merchant. Additional transactions or, more specifically, communications, between the host and the remote terminal include revision inquiries and responses thereto, and polling and responses thereto. Inquiries are typically performed on-line. An authorization of certain transactions is also performed on-line by an operator having sufficient authority. While some transactions are described as being communicated between the host and the remote terminal, it is to be understood that some transactions such as an authorization also require communication between the host and a selected database.

A close batch transaction is generally performed at the end of a predetermined time period or after a predetermined number of transactions have been processed. Typically, a close batch is performed at the end of each day to transmit to the host any remaining off-line transactions which were not yet received by the host, and to reconcile and balance transaction data in the terminal with transaction data in the host. As will be appreciated, by transmitting off-line transactions throughout the day to the host, the time for the close batch to be performed at the end of the day is significantly decreased. Moreover, time required for detection and correction of errors is also significantly reduced since any errors associated with the off-line transactions transmitted throughout the day would have been detected and corrected, to the extent possible, when transmitted.

Transactions related to a sale of goods, services or the like typically require an authorization from the host to be transmitted to the merchant location. For example, in the event a consumer wishes to purchase a relatively expensive item with an American Express (TM) credit card, the host must first authorize the sale. The host accesses the American Express (TM) database (144 in FIG. 4) to determine whether to authorize the sale. This transaction is typically performed on-line and requires a call to the host.

A return/credit transaction relates to crediting a consumer's account by an amount. For example, if a consumer returns defective merchandise, his account would be credited with his cost of the merchandise. Typically, such transactions do not require authorization from the host and may be performed off-line.

A ticket only transaction relates to a sale which does not typically require an authorization from the host. For example, if a consumer purchases a relatively inexpensive item with a credit card, it may be economically feasible and worth a calculated risk to forego approval from the host. Accordingly, this transaction may be performed off-line, i.e., at the terminal.

An authorization only is a transaction in which a consumer is approved to have a certain charge or hold placed against his account without actually crediting a merchant with any amount or charging the consumer. For example, a credit card may be used to guarantee payment such as when one rents merchandise, regardless of how payment is eventually made. An authorization only transaction is typically performed on-line and requires communication with the host.

The following "void" transactions may be performed off-line: a void sale transaction which voids a previously entered authorization and ticket transaction; a void return transaction which voids a previously entered return/credit transaction; a void ticket only transaction which voids a previously entered ticket only transaction.

A previous processing day deposit inquiry transaction is a request made to the host from the terminal regarding the results of the previous day's close batch transaction. This transaction is typically performed on-line. Other inquiry type transactions may also be performed, such as an inquiry of an off-line transaction not yet sent to the host; such a transaction could be performed off-line.

The above-described illustrative transactions, as well as other transactions, are preferably initiated by depressing an appropriate key on keyboard 120 or 122. For example, to initiate a typical credit card sale, which requires authorization, a sales clerk may depress a key entitled "authorization and ticket" on keyboard 122.

Further information concerning the format of specific data fields associated with various transactions and communications between a terminal and the host is set forth in the above-identified application Ser. No. 07/677,717.

In accordance with the invention, transactions which require immediate communication with the host computer (i.e., on-line transactions), such as authorization requests, are transmitted as they occur via the network's D channel (instead of the B channel) with messages formatted according to the Q.931 standard and with the transaction data transmitted as the information element of the messages.

Transactions which do not require immediate communication with the host do not need to be transmitted as they occur, although they may be so transmitted. Such transactions are also preferably transmitted via the network's D channel, using the information element of the messages formatted according to the Q.931 standard. Transmission of off-line transactions preferably occurs throughout the day via the information element provided by Q.931 for communication over the network's D channel. Such transmission occurs whenever convenient to do so or whenever less likely to result in unnecessary B channel communication. However, at times, it may be desirable to transmit such off-line transactions to the host over the network's B channel, especially during an idle period of a previously established B channel communication in which the terminal awaits acknowledgment from the host. Transmission of off-line transactions during an idle period, referred to as "piggybacking", is disclosed in the above-identified application Ser. No. 07/677,717.

Because all transaction data, whether off-line or on-line, can be transmitted to the host over the D channel as information elements of the messages defined in the Q.931 standard without the need to establish a conventional telephone call over the B channel, on-line transactions made over the D channel are no longer necessarily at a cost disadvantage visa vis off-line transactions. Accordingly, system overhead previously required to distinguish these two types of transactions is no longer as critical as it once may have been.

In the preferred embodiment of the invention, the calling stations are POS terminals 114 and the called station is host computer 112. Accordingly, the conventional sequence of messages described above in conjunction with FIG. 3 is modified such that the information exchange between the POS terminals and the host computer can be accomplished without establishing a connection over the B channel.

Figure 5:
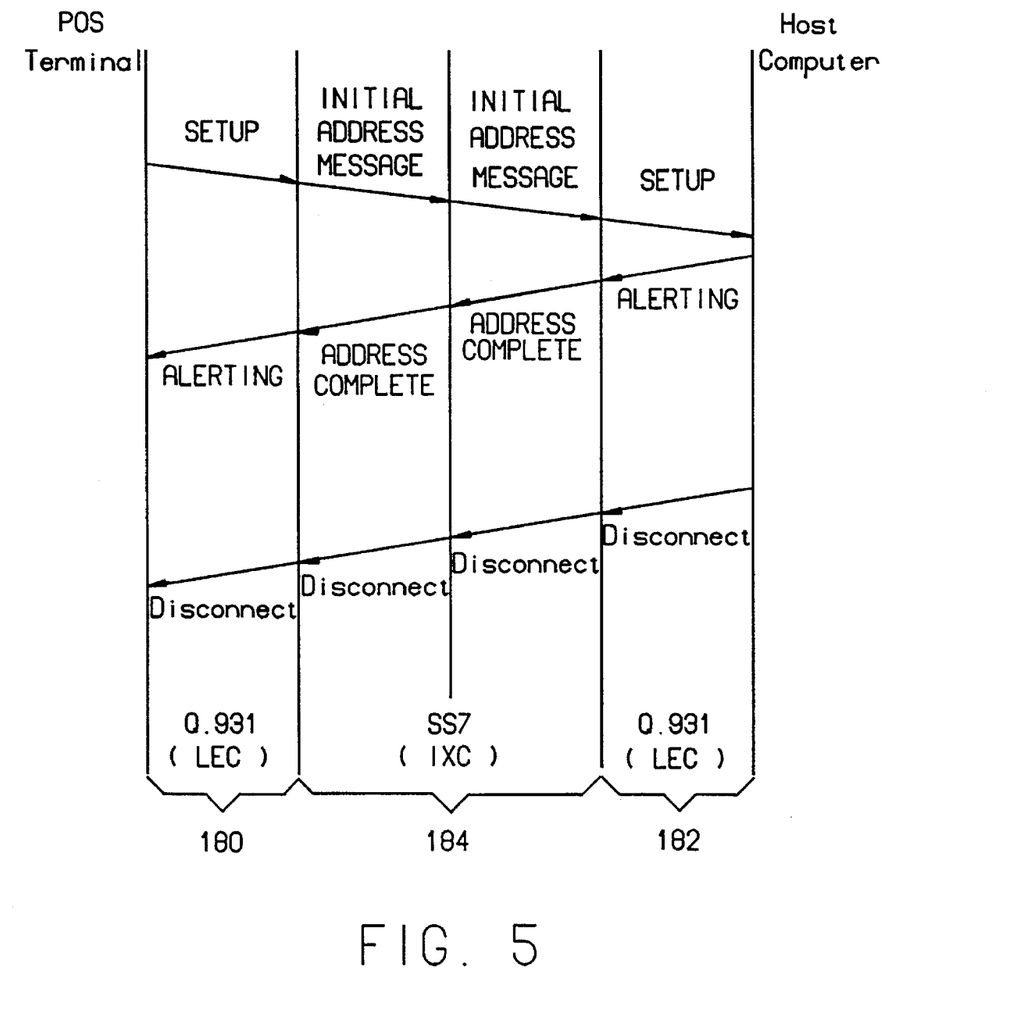
FIG. 5 schematically depicts the sequence of messages employed by the system of the present invention.

In this regard, FIG. 5 depicts the sequence of messages, formatted in accordance with the Q.931 standard, transmitted by the communicating entities over the D channel. The messages issued and received by the POS terminals are depicted on the left-hand side of FIG. 5 as 180; the messages issued and received by the host are depicted on the right-hand side of FIG. 5 as 182. The messages generated by the SS7 network are depicted in the center of FIG. 5 as 184.

It should be noted that "set-up", "alerting" and "disconnect" messages symbolically depicted in FIG. 5 contain the "user-user information element" defined in Q.931 and discussed in conjunction with, inter alia, FIG. 2. Accordingly, any applications running at the calling and called stations can exchange information over this element, without affecting the signalling data provided in the other fields of the messages defined in Q.931 for call routing and control.

According to the communications scheme of the present invention, the POS terminal sends the "set-up" message, which contains the transaction data, to the host computer. Such transaction data is contained in the "user-user information element" and may be encoded using techniques known to those skilled in the art. For example, the "user-user information element" of the "set-up" message may contain an authorization request and/or data relating thereto. The nature of information transmitted between the POS terminals and the host is discussed in detail above and does not need to be repeated here. Similarly, the nature of the transmission, including the structure of the set-up, IAM, alerting and address complete messages, has been discussed in conjunction with FIG. 3 and does not need to be repeated here.

The host issues an "alerting" message in response to the "set-up" message. Illustratively, the data encoded in the "user-user information element" associated with the "alerting" message indicates to the requesting terminal that the request has been received and is being processed. After the host has completed processing of the authorization request, the "disconnect" message is sent to the calling POS terminal (instead of the "connect" message discussed in conjunction with FIG. 3 that would have been sent conventionally). The "user-user information element" of the "disconnect" message contains the response to the authorization request sent by the terminal in the "connect" message. For example, the "user-user information element" of the disconnect message may contain an approval or denial of the authorization request and/or an authorization code determined by the host in response to the authorization request. Alternatively, such non-conventional data (i.e., authorization code, approval, denial, etc.) may be sent in the "user-user information element" within the "alerting" message.

In response to the disconnect message, the network initiates the release of the resources reserved by the transaction. Accordingly, during the transaction symbolically depicted in FIG. 5, the voice connection over the B channel has never been and does not need to be established. The advantages of exchanging information without utilizing network resources reserved for B channel voice communication are explained in detail above. As indicated, this mode of communication will benefit the processing of both on-line and off-line transactions.

The present invention will now be described in the context of an illustrative software implementation in which an authorization request transaction is processed. It will be appreciated that the present invention is suitable for use with other transactions and is adaptable for use with a variety of other applications and communication systems. It will also be appreciated that a variety of software implementations of the present invention are feasible.

In general, an application-oriented protocol is used to coordinate the activities between the remote terminals and the host and to ensure common syntax and semantics for the transmitted application data. For example, the application-oriented protocol may specify a particular type of encoding for an authorization request, consumer or card identification data (such as account number and expiration data), encoding of a response (i.e., allow or deny) to an authorization request, etc., as well as the organization of such information within a message. The application-oriented protocol uses network services to transmit data between the nodes of the ISDN network. As indicated, in this embodiment the network services are accessed using the messages formatted according to the Q.931 communication protocol standard (except for the "user-user information elements" of the Q.931 messages which do not affect data communication over the network). The data formatted according to the application-oriented protocol is transmitted via the "user-user information elements" of the Q.931 messages and is transparent to the network.

The terminal software comprises suitable operating software such as an application program, routines for accessing ISDN, creating message packets, sending message packets to the host, receiving message packets from the host, receiving data from the magnetic strip reader, and displaying data to a user.

More specifically, when the magnetic strip of a card is passed through the card reader device, information stored on the strip is read and transmitted to an input memory buffer in the terminal. A "terminal application program" repeatedly calls a "card reader" routine to determine if the card data is resident in the input buffer. If there is such card data in the input buffer, the terminal application program calls a "read card data" routine which reads the data. This routine calls lower level routines which retrieve the card data from the input buffer and then provide the data to the terminal application program.

Thereafter, the terminal application program formats an authorization request message string according to the application-oriented protocol. The message string comprises, for example, an encoding of an authorization request and the data read from the magnetic strip of the card. Then, the application program calls an "initiate session" routine that takes the terminal "off-hook" and sends the "set-up" Q.931 message over the D channel to the host. To create a message to the host, an "initiate session" routine calls a "create packet" routine and sends the message string formatted according to the application-oriented protocol to the create packet routine. The create packet routine then creates a "message packet" formatted according to the Q.931 protocol. As indicated, the Q.931 messages employed in this embodiment generally comprise the application-oriented message string in the "user-user information element" of the message as well as other data required for network communication. The message packet, suitably formatted by the create packet routine, is then sent by a "send message" routine over the D channel to the host. The send message routine calls lower level routines that perform the functions of MTP levels one and two, such as interfacing with the hardware to send the message packet over the D-channel.

To receive messages from the host, such as the "alerting" and "disconnect" Q.931 messages described in conjunction with FIGS. 3 and 5, the terminal application program calls a "receive message" routine. The receive message routine first calls a lower level routine to determine whether a message is waiting in a communications memory buffer. If a message is waiting in the communications buffer, the receive message routine calls a "retrieve" routine to retrieve the message from the buffer and then calls a parse routine to parse the message packet. All network communications protocol information is removed from the packet leaving only a message string transmitted via the "user-user information element" of the Q.931 packet. The receive message routine then returns this message string to the terminal application program.

When authorization related information is received from the host as a message string in the "user-user information element" of the disconnect message, the terminal application program calls a "display message" routine to facilitate the display of the received authorization information to a user. The display message routine calls lower level screen driver routines to display this information.

The host software comprises an applications program and associated routines for formatting message packets, sending message packets to a terminal, receiving message packets from a terminal, and interfacing with databases. The routines that format the Q.931 message packets, send message packets, and receive message packets are similar to the corresponding terminal software routines and call similar lower level routines to aid in performing these functions. As indicated previously, when the host receives card data from the terminal in the "user-user information element" of the "set-up" message, the host formats and transmits the "alerting" message to the terminal. Subsequently, the disconnect message is formatted and sent to the terminal. Advantageously, an authorization response is sent to the terminal as part of the "user-user information element" of the disconnect message.

To determine the authorization response to be included in the disconnect message, the "host application program" calls several database routines. When the host computer receives card data from the terminal, an "authorization request" routine is called by the host application program. The authorization request routine calls a format routine to format a database request corresponding to the transmitted card data and then calls a "send request" routine to request the card authorization information, i.e., whether or not to authorize the transaction, from the database. The send request routine returns the database information for a given card to the "authorization request" routine. The authorization request routine then calls a "format response" routine to parse such information and determine the appropriate response to send to the host application program for transmission to the terminal. In addition to calling such database routines, the authorization request routine also calls database modification routines to record information relating to authorization requests and the like in the database.

By virtue of the foregoing there is thus provided a method and apparatus for transmitting data in a digital telecommunications network in which such data, to the extent desired or possible, is transmitted over a signalling channel such as a D channel of an ISDN. Advantageously, such a system reduces the load on conventional ISDN voice and data channels, such as B channels, and potentially enables data transmission to occur at a lower cost.

While the present invention has been illustrated by description of an embodiment and while the illustrative embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. For example, the invention is not limited to use in POS systems or to any specific type of communication or transaction. Rather, the method and apparatus disclosed and claimed herein may be used in any suitable telecommunications network, such as a network of automatic teller machines (ATMs) connected to an ISDN. Additionally, while the present invention has been described in the context of communications between the remote terminal(s) and the host of an ETC system, it is also applicable to communications between the host and the various databases and the like. Accordingly, departures may be made from such details without departing from the spirit or scope of applicant's general inventive concept.

We claim:

1. A method of exchanging information between a host computer and at least one remote terminal in accordance with a communication protocol comprising the steps of:

sending a first message from said one remote terminal to said host computer over a signalling channel of an ISDN network, said first message comprising information required by the communication protocol and at least one information element not required by the communication protocol which contains encoded information to be communicated to an application running on the host computer;

sending a second message from said host computer over said signalling channel of the network to said one terminal, said second message being responsive to said first message; and sending a third message from said host computer over said signalling channel of the network to said one terminal, said third message being responsive to said first message and including a disconnect message;

wherein the exchange of messages between said host computer and said one terminal is independent of any non-signalling channel provided by the ISDN network.

2. The method of claim 1 further comprising the step of processing said information element communicated to said host, said step of processing including the step of interacting with at least one database accessible by said host to determine whether a transaction is to be authorized.

3. The method of claim 2 wherein said first and second messages correspond respectively to "set-up" and "alerting" messages in accordance with the Q.931 standard.

4. The method of claim 1 wherein the information element is encoded as the contents of a user-user information element in accordance with the Q.931 standard.

5. The method of claim 1 wherein each remote terminal is a point-of-sale terminal for performing a variety of consumer transactions.

6. The method of claim 1 wherein an authorization request is encoded as the contents of said information element of said first message and an authorization code determined by the host is encoded as the information element of the third message.

7. The method of claim 1 wherein an authorization request is encoded as the contents of said information element of said first message and an authorization approval or denial determined by the host is encoded as the information element of the third message.

8. The method of claim 1 wherein an authorization request is encoded as the contents of said information element of said first message and authorization information is encoded as the information element of the second message.

9. A transaction processing system comprising:

a host computer system including means for retrieving transaction data from information transmitted to said host;

a plurality of remote terminals, each of said terminals having means for generating a message to be communicated to said host computer and means for interpreting a message received from said host computer, said message communicated to said host including said transaction data;

a network for enabling communication between said host computer and said terminals in accordance with a communication protocol, said network providing each of said terminals with a plurality of multiplexed communication channels, at least one of which channels is a signalling channel; and means for reprogramming the remote terminals in response to programming information from the host, wherein each of said terminals includes means to exchange information with said computer by sending and receiving messages over said signalling channel of said network independent of other channels of said network, each of said messages including a first portion for data required for network communication by the communication protocol and a second portion for data representing the information not required by the communication protocol that is exchanged between said host computer and said terminal.

10. The system of claim 9 wherein said network is an ISDN network.

11. The system of claim 10 wherein said signalling channel is a D channel provided by said ISDN network.

12. The system of claim 11 wherein said messages to be communicated to said host computer and said messages received from said host computer are formatted according to the Q.931 standard.

13. The system of claim 12 wherein said messages to be communicated to said host computer and said messages received from said host computer are transmitted over said ISDN network as part of a user-user information element formatted according to the Q.931 standard.

14. The system of claim 13 wherein the exchange of information between the host computer and each of the terminals is accomplished solely over said D channel of the ISDN network.

15. The system of claim 14 wherein each of said terminals is a point-of-sale (POS) terminal for performing a variety of consumer transactions such as sales, returns, authorizations, deposit inquiries, and voiding of a previously entered transaction.

16. The system of claim 15 wherein each of said POS terminals comprises at least one computer unit, associated peripherals, and interfaces to the network.

17. The system of claim 16 wherein said peripherals comprise a transaction data input device for entering transaction data to be communicated to the host computer over the network.

18. The system of claim 17 wherein the peripherals further comprise a consumer input device for entering data specific to a given consumer.

19. The system of claim 18 wherein the consumer input device is a card reader adapted to read encodings provided on a plastic card.

20. A method for transmitting a request related to a consumer transaction from a merchant to a host computer and for processing the request comprising the steps of:

provide a terminal connected to the host via an ISDN network having at least one signalling channel;

inputting consumer data including account information identifying a consumer's account into a memory of the terminal;

encoding an application message string, which includes the consumer data and the request, as a user-user information element in accordance with an application-oriented protocol, such that the message string can be interpreted by software running on the host;

formatting a communication message according to a communications protocol, which communication message includes the application message string and data for controlling message transmission across the ISDN network from the terminal to the host; and transmitting the communication message over the signalling channel of the ISDN network.

21. The method of claim 20 wherein the signalling channel is a D channel.

22. The method of claim 21 wherein the communication message is formatted according to the Q.931 standard.

23. Apparatus for transmitting a request related to a consumer transaction from a merchant to a host computer and for processing the request comprising:

a terminal connected to the host via an ISDN network having at least one signalling channel;

means for inputting consumer data including account information identifying a consumer's account into a memory of the terminal;

means for encoding an application message string, which includes the consumer data and the request, in accordance with an application-oriented protocol, such that the message string can be interpreted by software running on the host;

means for formatting a communication message according to a communications protocol, which communication message includes the application message string and consumer data for controlling message transmission across the ISDN network from the terminal to the host;

means for transmitting the communication message over the signalling channel of the ISDN network: and means for reprogramming the terminal in response to programing information from the host.

24. The apparatus of claim 23 wherein the signalling channel is a D channel.

25. The apparatus of claim 24 wherein the communication message is formatted according to the Q.931 standard.

26. The apparatus of claim 25 wherein the application message string is transmitted as a user-user information element.

27. In a host computer, having access to at least one database and being connected to a terminal via an ISDN network, a method of processing a consumer transaction request comprising the steps of:

receiving a request message from a signalling channel of the ISDN network, which message includes an application message string formatted according to an application-oriented protocol, and other data for controlling message transmission across the ISDN network;

parsing the request message so as to separate the application message string from the other data in the request message;

interpreting the message string in accordance with the application-oriented protocol so as to identify and process consumer data including consumer account information;

retrieving information related to the consumer from the database;

generating a response message on the basis of the retrieved information; and sending a response communication message over the signalling channel of the ISDN network;

wherein the processing of the consumer transaction request is independent of any non-signalling channel provided by the ISDN network.

28. The method of claim 27 wherein the signalling channel is a D channel.

29. The method of claim 28 wherein the request message and response communication message are formatted in accordance with the Q.931 standard.

30. The method of claim 29 wherein the request communication message is a Q.931 set-up message and the response message is a Q.931 disconnect message.

31. Apparatus for processing a consumer transaction request comprising:

a host computer;

a remote terminal, said host computer and said terminal each being capable of two-way communication with each other via an ISDN network;

at least one database accessible by said host;

means for receiving a request message from a signalling channel of the ISDN network, which message includes an application message string formatted according to an application-oriented protocol, and other data for controlling message transmission across the ISDN network;

means for parsing the request message so as to separate the application message string from the other data included in the request message;

means for interpreting the message string in accordance with the application-oriented protocol so as to identify and process consumer data including consumer account information;

means for retrieving information related to the consumer from the database;

means for generating a response message on the basis of the retrieved information; and means for sending a response communication message over the signalling channel of the ISDN network.

32. The apparatus of claim 31 wherein the signalling channel is a D channel.

33. The apparatus of claim 32 wherein the request message and response communication message are formatted in accordance with the Q.931 standard.

34. The apparatus of claim 33 wherein the request communication message is a Q.931 set-up message and the response message is a Q.931 disconnect message.

* * * * *